(No Model.)  3 Sheets—Sheet 1.

T. NESOM.
TRANSMISSION OF ELECTRICITY TO MOVING CARS.

No. 551,734. Patented Dec. 17, 1895.

Witnesses
A. J. Courtright.
Lela Monroe.

Inventor
Thomas Nesom
By Attorney V. H. Lockwood (No Model.) 3 Sheets—Sheet 2.
T. NESOM.
TRANSMISSION OF ELECTRICITY TO MOVING CARS.
No. 551,734. Patented Dec. 17, 1895.
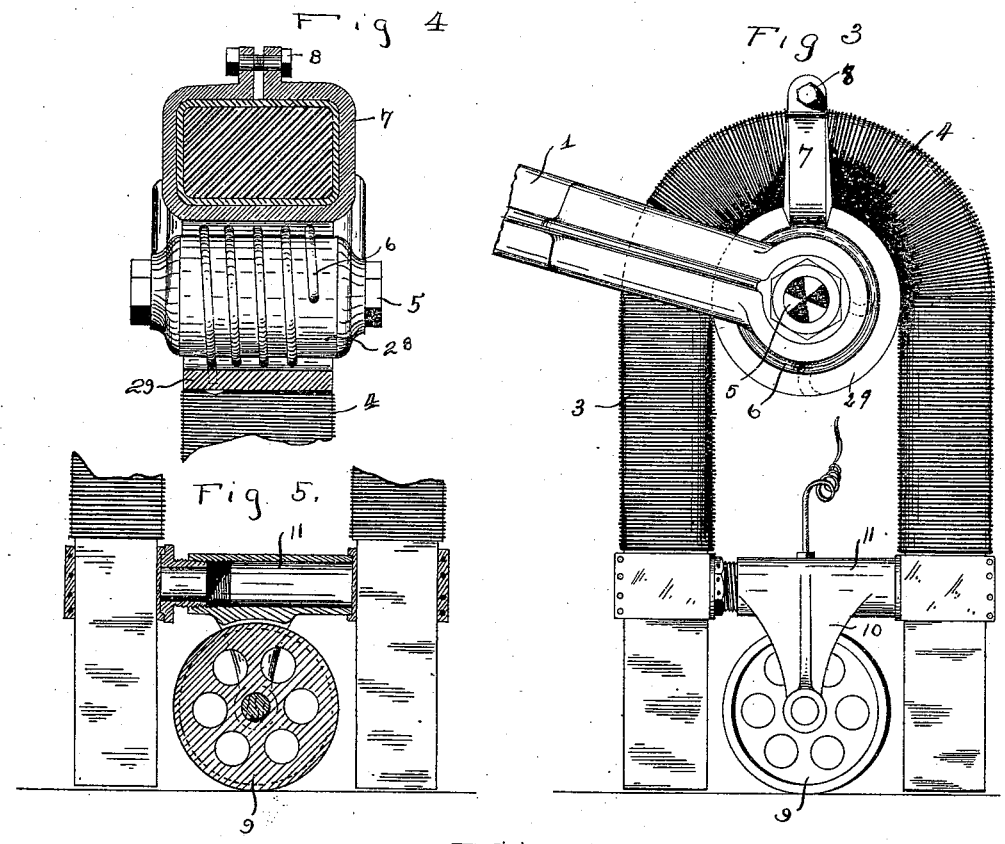
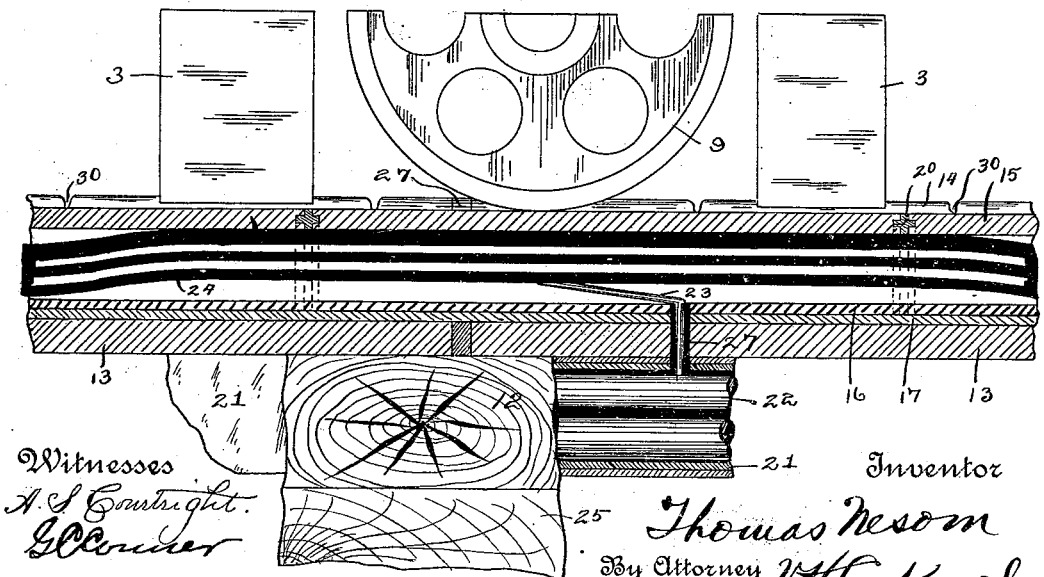

(No Model.) 3 Sheets—Sheet 3.
T. NESOM.
TRANSMISSION OF ELECTRICITY TO MOVING CARS.
No. 551,734. Patented Dec. 17, 1895.
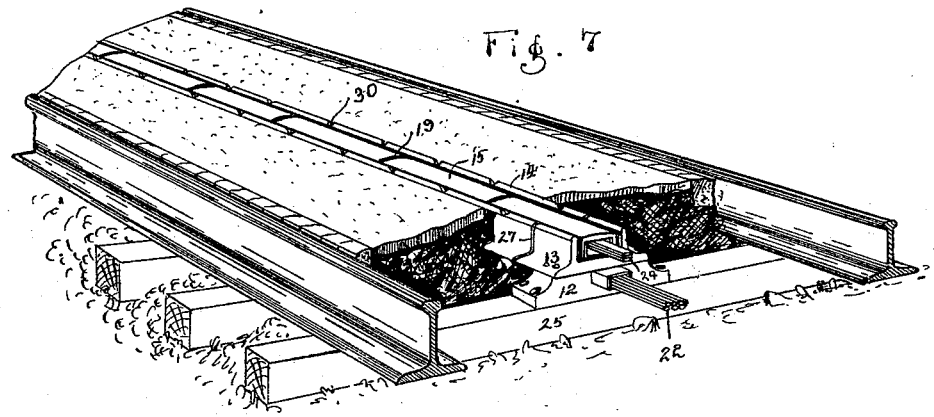
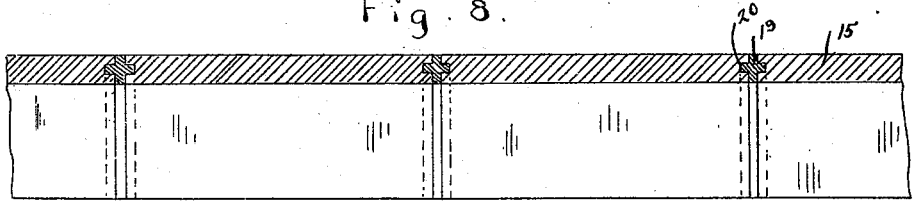
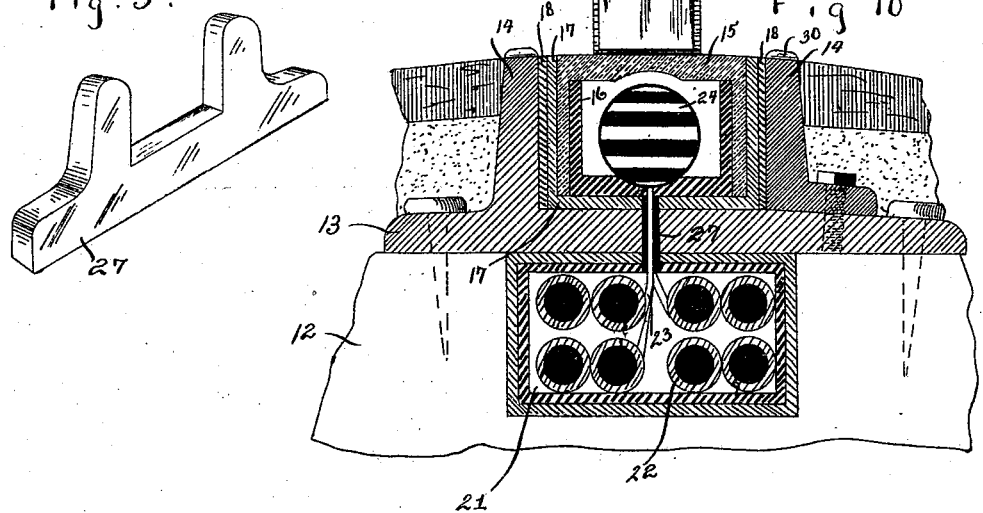
Witnesses
A. S. Courtright.
G. C. Cormier
Inventor
Thomas Nesom
By Attorney J. H. Lockwood

UNITED STATES PATENT OFFICE.

THOMAS NESOM, OF INDIANAPOLIS, INDIANA, ASSIGNOR, BY DIRECT AND MESNE ASSIGNMENTS, OF ONE-HALF TO WILLIAM D. ECKENRODE AND EDWARD S. DE TAMBLE, OF SAME PLACE.

TRANSMISSION OF ELECTRICITY TO MOVING CARS.

SPECIFICATION forming part of Letters Patent No. 551,734, dated December 17, 1895.

Application filed September 21, 1894. Serial No. 523,697. (No model.)

*To all whom it may concern:*

Be it known that I, THOMAS NESOM, of Indianapolis, county of Marion, and State of Indiana, have invented certain new and useful Improvements in the Transmission of Electricity to Moving Cars; and I do hereby declare that the following is a full, clear, and exact description thereof, reference being had to the accompanying drawings, in which like letters refer to like parts.

My invention relates to a novel method of transmitting electricity from a stationary generating-plant to a moving car or other body. Its object is to provide a system on the surface instead of overhead, and thus abolish the poles and wires that are required by the overhead-trolley system and which are so costly, obstructive, dangerous, and unsightly in our streets. My system is a surface-trolley system as contradistinguished from the overhead and underground systems.

A great difficulty with the underground systems heretofore devised has been due to the fact that the conduit was open whereby water would be admitted. I have provided in my system a closed water-tight conduit.

A feature of my system consists in providing a conduit whose top is made of electrical conducting material, placing loosely therein a live wire or line conductor or strip of less thickness than the conduit, so that normally it will lie in the bottom of the conduit with its top approaching so near the top of the conduit that a strong magnet will lift it into contact with such top. I then mount the trolley or contact device which is on the conductor attached to the car within a magnet or magnetic field and at such place that it will contact with the top of the conduit. When the magnet lifts the conducting-wire up to the top of the conduit, the circuit is closed for the transmission of electricity.

There are other features of my invention which will appear from the following description and the accompanying drawings.

Figure 1:
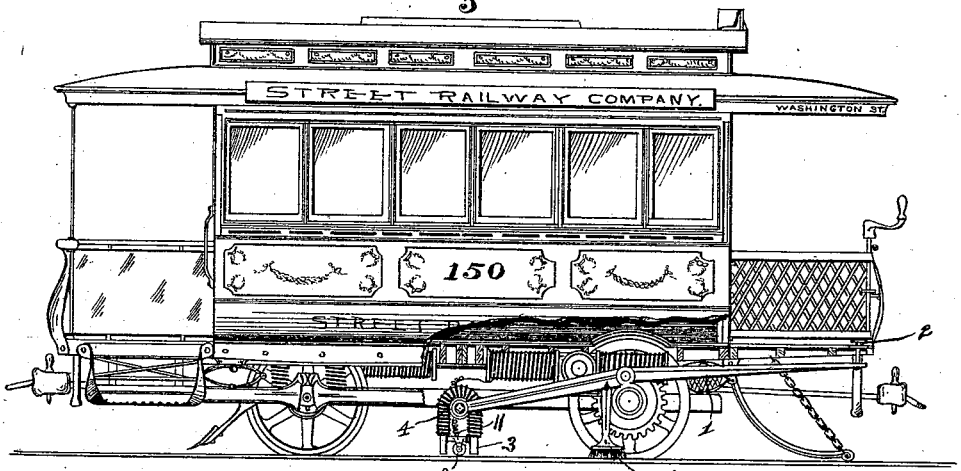
Figure 2:
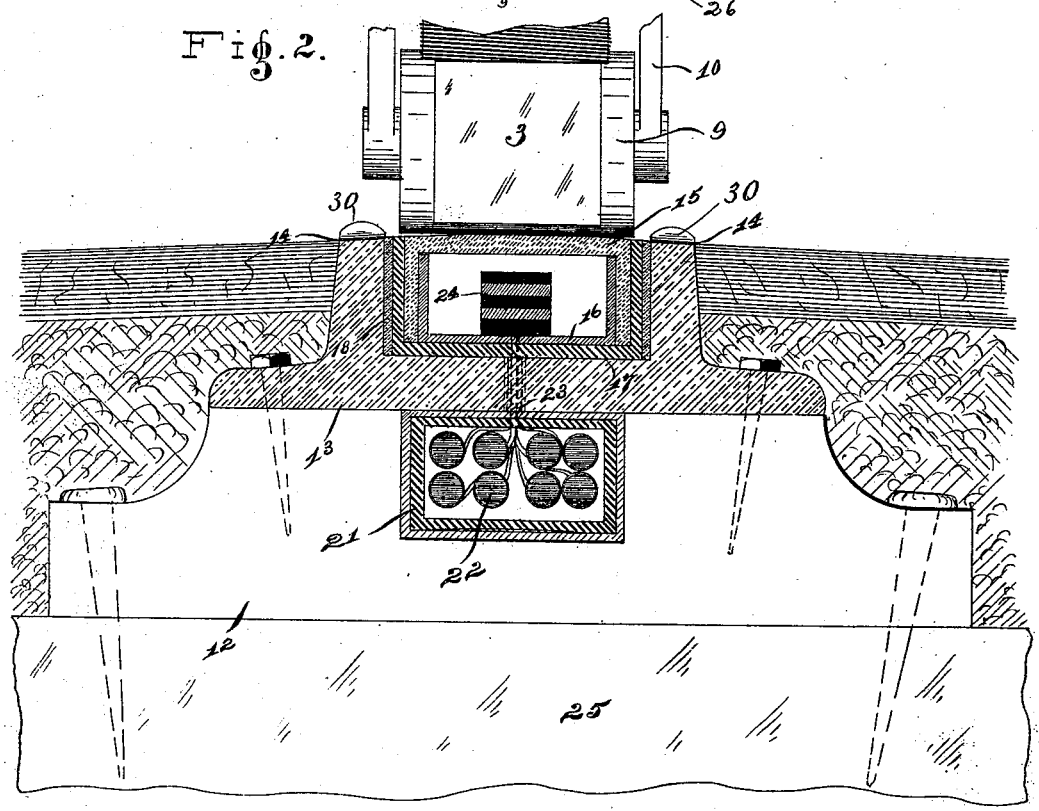

Figure 1 of the drawings is a side elevation of a street-car with the front right-hand lower corner cut away to exhibit the mounting of the trolley. Fig. 2 is a cross-section of the construction in the middle of the track embodying the conduit and showing the lower part of the magnet and the trolley resting on the conduit. Fig. 3 is an enlarged view of the trolley and magnet in side elevation. Fig. 4 is a detail view of the method of mounting the magnet upon the inner end of the supporting-lever. Fig. 5 is a longitudinal vertical section to show the means of mounting the trolley-wheel in the magnet. Fig. 6 is a longitudinal section of the conduit with the live wire lifted by the magnet, the accompanying parts being broken away. Fig. 7 is a perspective of a portion of the track with my conduit and conducting-line laid therein. Fig. 8 is a longitudinal section of the conduit alone. Fig. 9 is a perspective of the insulating-block between the rails, and Fig. 10 is a cross-section showing a round wire and two-piece conduit-holder.

On a car constructed in the ordinary way and with motors mounted as usual I place a supporting-lever 1 on the front axle with one end extending forward beneath the platform of the car and the other end extending rearward to the middle of the car. On the front end I mount a vertical pedal or push-rod 2, which extends up through an opening in the platform to the height of, say, three inches. On the inner end of the lever I mount a permanent magnet 3 preferably horseshoe-shaped with the poles extending downward, one behind the other. The core of the magnet I here show is one whose width is about twice its thickness, and around the upper part of it I put a suitable winding of insulated wire 4 to increase its power while the current is passing. The method I here show of mounting it on the inner end of the lever consists in dividing the lever at its rear end and providing a wrist pin or bolt 5 surrounded by a sleeve 28 extending through the magnet, and all clamped together tightly by the nuts on the bolt. About the sleeve on the bolt 5 is coiled a spiral spring 6 suitably connected at one end to the sleeve and at the other to the bearing 29, which is provided with a clamp 7 integral therewith and extending up about the yoke of the magnet where its ends are securely clamped together by the bolt 8. This bearing and clamp are here made of insulating material but may be made of any material properly insulated. The purpose of the spring 6 is to allow the lower end of the magnet to have some freedom of movement longitudinally. Between the poles of the magnet I mount the trolley 9 in depending arms 10 from an extensible bolt 11, composed of two parts or ends, one screwing into the hollowed and threaded end of the other, and the whole mounted in bearings secured to the magnet. This part of the device should be so constructed that the trolley will extend very slightly below the ends of the magnet. From the bolt 11 a wire leads to the motors. The passing current strengthens the magnet.

In the middle of the track I place on the cross-ties 25 blocks of wood 12 made in any desired form or size, on which I secure an iron conduit-holder or trough-shaped bar 13 made in cross-sections, as shown in Fig. 2. This may be made in sections of any desired length and consists of a bottom with two vertical flanges or sides 14 that when laid in the track extend very slightly, say a fraction of an inch, above the road-bed. The sections are insulated from each other by the insulating-block 27, made preferably of elastic material. I then make the conduit or box 15 preferably with a top and sides only. It is made preferably of copper with a top slightly oval, as shown in Fig. 2 in cross-section, to allow the water to flow off, but since the trolley is to contact with the top of the conduit the oval should be very slight in order to allow considerable contact. After making this box I place in it the insulating-lining 16 which insulates the bottom and sides. I then place across the rail or conduit-holder 14 a strip of insulating material 17 and placing the conduit 15 on top of this push it down into the trough of the conduit-holder 13. I then melt lead or other suitable material and pour it in between the flanges 14 of this rail and the insulating-material 17 so as to make a water-tight packing 18. In this way my conduit is rendered absolutely water-tight and also absolutely closed excepting where the wires from the feed-wires to the line conductor enter. The copper conduit 15 is formed in sections about two feet long, as shown in Fig. 7, which sections are connected by insulating-strips 19 which are fitted in grooves 20 made centrally in the walls of the box 15 and so packed that the connection will be water-tight and flush with the outer surface. The conduit is made and packed in the conduit-holder in the shop before it is taken to the track to be laid.

In the block 12 I place a box 21 well insulated, containing feeding-wires 22 for the supply of electricity from the generating-plant. From these, connecting-wires 23 extend up through the insulating-block 27 between the sections of the conduit-holder 13 and the insulating material forming the bottom of the conduit to be secured to the conducting wire or strip 24. Each wire 23 is connected to the line conductor 24, as shown in Fig. 8, the former being bent and connected to the conductor a few inches from the entrance. This construction is to enable the line conductor 24 to be lifted up into engagement with the top of the conduit 15. The connection for feeding the line conductor may be made at any desired intervals. The passage through the insulating-block 27 perfectly insulates the connecting-wires from the conduit-holder and renders the connecting-wires readily accessible. The line conductor 24 I preferably make laminated, as shown in Fig. 2, consisting of alternating strips of copper and iron formed into a continuous wire. The top of this line conductor 24 should extend so nearly to the top of the conduit 15 that the magnet will lift the line conductor up against the top 15, and yet it should when resting in the bottom of the conduit be so far from the top that there would be no danger of transmitting electricity to the top of the conduit. This construction is preferably placed in the track as follows: The feed-wires 22 are placed in the blocks 12 on the cross-ties 25. The sections of the conduit-holder 13 are then laid and secured on the blocks 12. The line conductor 24 as these are laid is pushed through the conduit and at the joints the insulating-blocks 27 are inserted and through them the conduit-holder 13 is connected with the feed-wires. The flanges 14 of the conduit 15 are provided on their upper edges with little grooves 30 along their length to permit the water to flow between them and not remain on the conduit. In order to keep the conduit clean I mount brushes 26 in front of the trolley.

In operating the car the driver will not touch the pedal but leave the weight of the trolley and magnet to hold them down in contact with the conduit 15. The mounting of the lever 1 should permit a little lateral play of the trolley while the car is making curves. The trolley runs along directly upon the top of the conduit 15 and the magnet located near it draws the conducting-wire 24 up into engagement with the top of the conduit 15 whereby the circuit between the wire and trolley is effected. When the driver desires to break the circuit he pushes the pedal down with his foot, thus lifting the trolley and magnet up out of engagement with the conduit. The trolley should be placed near the middle of the car in order that no portion of the conduit 15 accessible to individuals would be electrified. With my construction there would never be more than two sections of the conduit 15 electrified at once and that would be while the trolley was passing a joint. Hence there would never be more than, say, two feet on each side of the trolley electrified, and since the trolley is in the middle of the car no portion of the conduit either in front or behind the car would be electrified. While persons were getting under the car for repairs or other purposes, the magnet would be lifted up from the conduit, thus breaking the circuit between the line conductor 24 and the top of the conduit. By making the conduit 15 in sections also I would be enabled to locate any defect in insulation or the conductor. By making the bottom of the conduit only of insulating material there would be no opportunity possible for electricity to be transmitted to the top of the conduit 15 excepting when a magnet should be applied to it. Any break or wear in the insulating material at the bottom of the conduit will not produce this effect and such insulation being very thick the whole device is rendered free from danger. The insertion of the insulating-blocks 27 between the sections of the conduit-holder not only insulates them from each other, but allows for the contraction and dilitation of a line arising from changes of temperature, so that the joint is always water-tight. Of course the line conductor 24 is very flexible, whereby the lift of the magnet on it will be only local.

Another and probably a more scientific way of describing my conduit and line conductor is to consider the conduit a sectional conductor, each section being fed from a supply-wire, as the trolley passes over the section, by bringing the supply-wire into contact with the section by means of a magnet.

Thus it is seen that I have a system for transmitting electricity to a car which is under the car absolutely water-tight, free from all danger, very economical as compared to the overhead system, and as efficient as the overhead system. The track does not have to be taken up, but the whole thing rests upon the ties. The mounting of the trolley in a magnetic field also tends to keep the trolley on the conduit or conductor by virtue of the attraction, so that there is no danger of the trolley leaving the conduit in making turns or otherwise.

Of course my conduit and line conductor may be made round, as seen in Fig. 10, instead of rectangular. I prefer the construction shown, as it gives me a better conducting medium and more contact between the line conductor and the top of the conduit, but there will be considerable contact between a round wire and a round conduit, enough for all practical purposes. The mode of insulation may be altered as thought best and other means of packing adopted instead of the lead packing I have here shown to accomplish the same purpose. If it be thought desirable that the sections of the conduit 15 should be more readily accessible than they are in this construction, the conduit-holder 13 could be made in two sections, as shown in Fig. 10, one of the flanges 14 could be bolted to the other section and thereby be separable, so that by removing it a section of the conduit could be removed.

While my system is preferably a surface-trolley system, still it can be used in an underground conduit, the trolley with the magnet being mounted on a suitable trolley pole or support which enters the underground conduit.

Without limiting myself to the specific construction herein shown and described, I claim as my invention, and desire to secure by Letters Patent, the following:

1. In a system for transmitting electricity to a moving car, a box containing feed wires, a conduit holder placed above such box in sections, an insulating block between such sections, a conduit in such conduit holder, a line conductor within such conduit, and connecting wires from the feed wires extending through such insulating blocks to the line conductor, substantially as shown and described.

2. In a system for transmitting electricity to a moving car, a trough-shaped conduit holder, insulating material within such trough, a conduit made in sections with sides and top placed inverted within such insulating material, water tight insulated joints between the sections of the conduit, and water tight packing between the conduit and the conduit holder, substantially as shown and described.

3. In a system for transmitting electricity to a moving car, a lever mounted between its ends to the car axle with one end extending beneath the platform and the other to the middle of the car, means on the front end for the driver to actuate the lever, a magnet mounted on the inner end of the lever, a contact device mounted near the magnet, and a conductor leading from such contact device to the motor, substantially as shown and described.

4. In a system for transmitting electricity to a moving car, the horse shoe magnet 3 with the poles extending downward and wound as shown and described, the contact device 9 mounted between the poles of the magnet, a conductor leading from such contact device to the motor, the lever 1 and the means of mounting the magnet on the lever substantially as shown and described.

5. In a system for transmitting electricity to a moving car, a bar suitably attached to the car, a horseshoe magnet pivoted to the bar with its poles extending downward, a spring for holding the magnet with its poles normally downward, a contact device mounted between the poles of the magnet, and a conductor extending from the contact device to the motor, substantially as shown and described.

In witness whereof I have hereunto set my hand this 19th day of September, 1894.

THOMAS NESOM.

Witnesses:
 DAVID F. SWAIN,
 V. H. LOCKWOOD.